Figure 1:
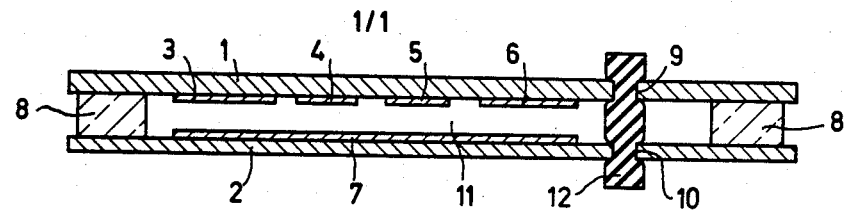

United States Patent [19]

Jacobs

[11] 4,226,509
[45] Oct. 7, 1980

[54] DISPLAY DEVICE COMPRISING A LIQUID DISPLAY MEDIUM

[75] Inventor: Jacobus H. Jacobs, Eindhoven, Netherlands

[73] Assignee: U.S. Philips Corporation, New York, N.Y.

[21] Appl. No.: 968,900

[22] Filed: Dec. 13, 1978

[30] Foreign Application Priority Data

Jan. 10, 1978 [NL] Netherlands .................. 7800275

[51] Int. Cl.² ................................................. G02F 1/13
[52] U.S. Cl. ................................... 350/343; 350/357
[58] Field of Search ......................... 350/343, 357

[56] References Cited

U.S. PATENT DOCUMENTS

| | | |
|---|---|---|
| 3,799,649 | 3/1974 | Carlyle .................... 350/343 |
| 3,808,769 | 5/1974 | Gardiner et al. ............ 350/343 X |
| 3,910,029 | 10/1975 | Yamazaki .................. 350/343 X |
| 3,967,882 | 7/1976 | Kubota et al. ............ 350/343 X |
| 3,990,781 | 11/1976 | Gum ...................... 350/343 |

Primary Examiner—Edward S. Bauer
Attorney, Agent, or Firm—Thomas A. Briody; Jack Oisher; Paul R. Miller

[57] ABSTRACT

In a display device having a liquid display medium, for example liquid crystal, the filling apertures have to be readily sealed. In a seal which is very suitable for mass production a piece of elastic material is drawn through two oppositely located filling apertures or between a brace across the filling aperture and the filling aperture.

7 Claims, 4 Drawing Figures

DISPLAY DEVICE COMPRISING A LIQUID DISPLAY MEDIUM

The invention relates to a display device comprising a liquid display medium between two supporting plates and having a filling aperture which is sealed by means of a sealing member.

Such a device may serve to display alphanumeric or visual information and the liquid display medium consists, for example, of a liquid crystal material or of a solution of an electrochromic material.

A device of the kind mentioned in the first paragraph, in particular a liquid crystal display device, is disclosed in U.S. Pat. No. 3,967,882. The display device described in the abovementioned Patent comprises two parallel supporting plates which are covered on the inside with a layer of electrode material. One or more spacers are present between the plates so as to keep the plates a certain distance apart. The space between the plates which falls outside the spacers comprises a edge seal. The space between the electrodes is filled with liquid crystal which is introduced through a filling aperture in at least one of the supporting plates. The filling aperture is sealed by sealing means. In this known device the sealing of a filling aperture has been effected by means of plastic plugs, preferably of a silicone or an epoxy resin. However, it is desirable to avoid the use of a silicone or epoxy resin in the non-hardened condition, since constituents hereof may enter the display medium and shorten the life of such a device.

It is an object of the invention to provide a seal for a filling aperture of a liquid-filled display device which prevents the penetration of liquid and gaseous impurities into the display medium. Another object of the invention is to considerably simplify the provision of a seal of a filling aperture in such a display device.

According to the invention, a display device of the kind mentioned in the first paragraph is characterized in that the sealing member is of an elastic material and extends through an aperture which is narrower than the cross-section of the elastic material in the stress-less condition, and that both ends of the sealing member are situated on the outside of the device. In a seal with, for example, a polythene stopper in which only one of the two ends is situated on the outside of the device, a good seal is not obtained since the stopper after the insertion works loose again outwards.

A preferred embodiment of the display device according to the invention is characterized in that both supporting plates have a filling aperture, said filling apertures being situated straight opposite to each other, and a wire-shaped piece of elastic material extends through both filling apertures.

In another preferred embodiment a sealing edge of the device comprises at least one pair of filling apertures which are situated in the elongation of each other and through which a wire-shaped piece of elastic material extends.

In still another preferred embodiment one of the plates comprises a filling aperture across which a brace is secured and a strip-shaped piece of elastic material extends through the aperture between the brace and the filling aperture.

A very suitable elastic material for the seal of the filling aperture is rubber.

A display device according to the invention comprises, for example, a liquid crystal or a solution of an electrochromic material as a display medium.

Figure 2:
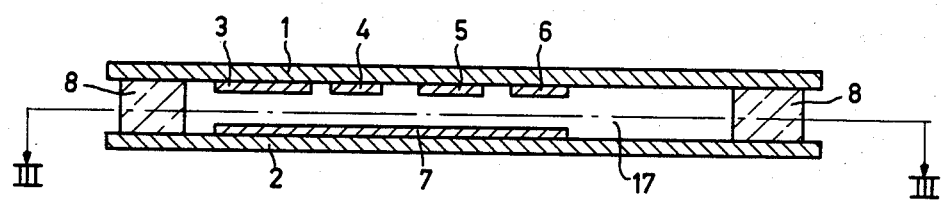
Figure 3:
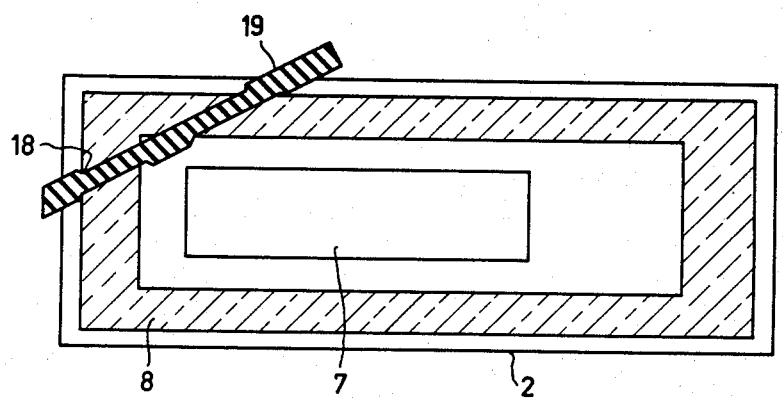
Figure 4:
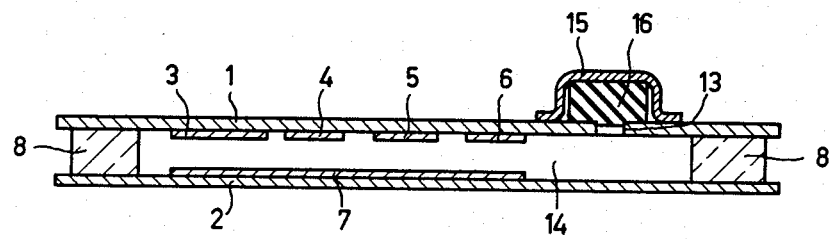

The invention will now be described in greater detail with reference to the accompanying drawing, of which FIG. 1 shows a device according to the invention in the case in which both supporting plates are provided with a filling aperture, FIG. 2 is a cross-sectional view of a device according to the invention in the case in which edge seal of the device has one pair of filling apertures, FIG. 3 is a sectional view taken on the line III—III shown in FIG. 2, and FIG. 4 shows a device according to the invention in the case in which one of the supporting plates has a filling aperture.

FIG. 1 shows the main parts of a display device according to the invention, namely two glass supporting plates 1 and 2. Supporting plate 1 is provided on its inside with a number of electrodes 3, 4, 5 and 6 which for displaying numeric information are usually provided in the form of a segmentary figure eight. A common counter electrode 7 is provided on the inside of supporting plate 2. In order to be able to observe the information, the electrode material on at least one of the supporting plates 1 and 2 should be transparent. The distance between the supporting plates is determined by a polyethylene frame 8 which also forms a sealing edge of the device. Both supporting plates 1 and 2 have filling apertures 9 and 10 via which the liquid display medium 11 is introduced into the space between the supporting plates 1 and 2. The filling apertures 9 and 10 have a diameter of, for example, 0,6 mm and are sealed by means of a wire-shaped piece of elastic material 12. The seal can be provided in a very simple manner. The wire-shaped piece of elastic material 12 which has a cross-section exceeding the cross-section of the filling apertures 9 and 10 is made thinner than the cross-section of the filling apertures 9 and 10 on one side over a length exceeding the thickness of the display device. After threading the thin part through both filling apertures 9 and 10 the elastic material 12 can easily be stretched until it has a cross-section which is smaller than the cross-section of the filling apertures 9 and 10. After threading the elastic material 12, a good seal is obtained by removing the elastic deformation. The filling apertures 9 and 10 in the supporting plates 1 and 2 are usually provided by sandblasting which produces sharp edges of the filling apertures 9 and 10. By stretching the wire-shaped elastic material 12 until it has a cross-section smaller than the cross-section of the filling apertures 9 and 10, it is also prevented that the elastic material 12 gets cracked along the sharp edges of the filling apertures 9 and 10. Since the elastic material 12 is thicker on both ends than in the apertures 9 and 10, it cannot work loose from the apertures. In this way a very simple provision of a seal for a filling aperture is obtained, which is very suitable for mass production.

FIG. 2 shows another embodiment of a display device according to the invention in which the reference numerals 1 to 8 have the same meanings as in FIG. 1.

FIG. 3 is a sectional view taken on the line III—III of FIG. 2. Two filling apertures 18 and 19 which are situated in the elongation of each other are provided in the edge seal formed by the polyethylene frame 8. The liquid display medium 17 is introduced into the space between the supporting plates 1 and 2 via the filling apertures 18 and 19. The filling apertures 18 and 19 are sealed by means of a wire-shaped piece of elastic material in the same manner as described with reference to FIG. 1.

FIG. 4 shows a third embodiment of a display device according to the invention in which the reference numerals 1 to 8 have the same meanings as in FIG. 1. In this embodiment only the supporting plate 1 has a filling aperture 3 through which the liquid display medium 14 is introduced into the space between the supporting plates 1 and 2. A brace 15 is provided on the supporting plate 1 above the filling aperture 13. The filling aperture 13 is sealed by drawing a strip-shaped piece of elastic material 16 between the brace 15 and the filling aperture 13, said strip-shaped piece being thicker at either end than in the aperture of the brace so that it cannot work loose from said aperture.

The liquid display medium 11, 14 and 17 may, for example, be a solution of a so-called viologen salt as described in U.S. Pat. No. 3,912,368 or a liquid crystal, for example, 2-(p-methyl-phenyl)-3-(p-hexyloxyphenyl) acrylonitrile which shows the effect of dynamic scattering, or di-p-n-butyl-azoxybenzene (DIBAB) which shows an electro-optical field effect.

What is claimed is:

1. A display device comprising a liquid display medium between two supporting plates and having a filling aperture which is sealed by means of a sealing member of an elastic material, characterized in that the sealing member is of an elastic material and extends through an aperture which is narrower than the cross-section of the elastic material in the stress-less condition, and that both ends of the sealing member are situated on the outside of the device.

2. A display device as claimed in claim 1, characterized in that both supporting plates have a filling aperture, said filling apertures being situated straight opposite to each other, and a wire-shaped piece of elastic material extends through both filling apertures.

3. A display device as claimed in claim 1, characterized in that a sealing edge of the device has at least one pair of filling apertures which are situated in the elongation of each other and through which a wire-shaped piece of elastic material extends.

4. A display device as claimed in claim 1, in which one of the supporting plates has a filling aperture, characterized in that a brace is secured across the filling aperture and that a strip-shaped piece of elastic material extends through the aperture between the brace and the filling aperture.

5. A display device as claimed in claim 1, 2, 3 or 4, characterized in that the elastic material is rubber.

6. A display device as claimed in claim 1, 2, 3 or 4, characterized in that the display medium is a liquid crystal material.

7. A display device as claimed in claim 1, 2, 3 or 4, characterized in that the display medium is a solution of an electrochrome material.

* * * * *